(12) United States Patent
Carrasco (10) Patent No.: US 8,284,943 B2
(45) Date of Patent: Oct. 9, 2012

(54) IP ENCRYPTION OVER RESILIENT BGP/MPLS IP VPN

(75) Inventor: Serge-Paul Carrasco, Menlo Park, CA (US)

(73) Assignee: Certes Networks, Inc., Pittsburgh, PA (US)

(*) Notice: Subject to any disclaimer, the term of this patent is extended or adjusted under 35 U.S.C. 154(b) by 918 days.

(21) Appl. No.: 11/656,077

(22) Filed: Jan. 22, 2007

(65) Prior Publication Data

US 2008/0075088 A1    Mar. 27, 2008

Related U.S. Application Data

(63) Continuation-in-part of application No. 11/529,559, filed on Sep. 27, 2006, now abandoned.

(51) Int. Cl.
*H04L 9/08* (2006.01)

(52) U.S. Cl. ............ 380/278; 709/242; 713/160; 726/1

(58) Field of Classification Search .............. 709/242; 380/278; 713/160; 726/1
See application file for complete search history.

(56) References Cited

U.S. PATENT DOCUMENTS

| | | | |
|---|---|---|---|
| 3,843,818 A | 10/1974 | Wren et al. |
| 4,120,989 A | 10/1978 | Grindstaff et al. |
| 4,200,770 A | 4/1980 | Hellman et al. |
| 4,517,215 A | 5/1985 | Hsu |
| 5,124,168 A | 6/1992 | McMillin et al. |
| 5,237,611 A | 8/1993 | Rasmussen et al. |
| 5,492,712 A | 2/1996 | Silver et al. |
| 5,577,209 A | 11/1996 | Boyle et al. |
| 5,812,671 A | 9/1998 | Ross, Jr. |
| 5,835,726 A | 11/1998 | Shwed et al. |
| 5,870,475 A | 2/1999 | Allan et al. |
| 5,940,591 A | 8/1999 | Boyle et al. |
| 6,035,405 A | 3/2000 | Gage et al. |
| 6,061,600 A | 5/2000 | Ying |
| 6,173,399 B1 | 1/2001 | Gilbrech |
| 6,185,680 B1 | 2/2001 | Shimbo et al. |
| 6,275,859 B1 | 8/2001 | Wesley et al. |
| 6,330,562 B1 | 12/2001 | Boden et al. |
| 6,351,536 B1 | 2/2002 | Sasaki |
| 6,484,257 B1 | 11/2002 | Ellis |
| 6,539,483 B1 | 3/2003 | Harrison et al. |
| 6,556,547 B1 | 4/2003 | Srikanth et al. |

(Continued)

OTHER PUBLICATIONS

U.S. Office Action in U.S. Appl. No. 11/880,890, mailed on Aug. 14, 2009.

(Continued)

*Primary Examiner* — Eleni Shiferaw
*Assistant Examiner* — Paul Callahan
(74) *Attorney, Agent, or Firm* — Hamilton, Brook, Smith & Reynolds, PC (57) ABSTRACT

Encryption of Internet Protocol (IP) traffic using IP Security (IPSec) at the edge of the enterprise network, in such a way as to support resilient BGP/MPLS IP VPN network designs. The IP traffic is securely tunneled within IPSec tunnels from the edge to the edge of the enterprise network. The IPSec traffic is also tunneled within MPLS tunnels from the edge to the edge of the service provider network. The enterprise network thus manages its own IPSec site-to-site VPN. The service provider thus independently manages its own MPLS network. The result provides an IP VPN or Layer 3 MPLS VPN to the enterprise; the enterprise IPSec network can thus be considered as an overlay to the MPLS service provider network.

20 Claims, 6 Drawing Sheets

U.S. PATENT DOCUMENTS

| | | |
|---|---|---|
| 6,591,150 B1 | 7/2003 | Shirota |
| 6,596,331 B1 | 7/2003 | Nobuyasu et al. |
| 6,658,114 B1 | 12/2003 | Farn et al. |
| 6,697,857 B1 | 2/2004 | Dixon et al. |
| 6,708,273 B1 | 3/2004 | Ober et al. |
| 6,711,679 B1 | 3/2004 | Guski et al. |
| 6,823,462 B1 | 11/2004 | Cheng et al. |
| 6,915,437 B2 | 7/2005 | Swander et al. |
| 6,920,559 B1 | 7/2005 | Nessett et al. |
| 6,981,139 B2 | 12/2005 | Enokida |
| 6,986,061 B1 | 1/2006 | Kunzinger |
| 7,082,198 B1 | 7/2006 | Ishii |
| 7,103,784 B1 | 9/2006 | Brown et al. |
| 7,106,756 B1 | 9/2006 | Donovan et al. |
| 7,373,660 B1 | 5/2008 | Guichard et al. |
| 7,395,306 B1 * | 7/2008 | Lai et al. ................. 708/700 |
| 2002/0069356 A1 | 6/2002 | Kim |
| 2002/0154782 A1 | 10/2002 | Chow et al. |
| 2002/0162026 A1 | 10/2002 | Neuman et al. |
| 2003/0012205 A1 | 1/2003 | Foti et al. |
| 2003/0135753 A1 | 7/2003 | Batra et al. |
| 2003/0177396 A1 | 9/2003 | Bartlett et al. |
| 2003/0182431 A1 | 9/2003 | Sturniolo et al. |
| 2003/0191937 A1 | 10/2003 | Balissat et al. |
| 2003/0200456 A1 | 10/2003 | Cyr et al. |
| 2003/0233576 A1 | 12/2003 | Maufer et al. |
| 2004/0005061 A1 | 1/2004 | Buer et al. |
| 2004/0044891 A1 | 3/2004 | Hanzlik et al. |
| 2004/0062399 A1 | 4/2004 | Takase |
| 2004/0103277 A1 * | 5/2004 | Seada et al. ................. 713/160 |
| 2004/0160903 A1 | 8/2004 | Gai et al. |
| 2004/0205342 A1 | 10/2004 | Roegner |
| 2004/0268124 A1 | 12/2004 | Narayanan |
| 2005/0010765 A1 | 1/2005 | Swander et al. |
| 2005/0048183 A1 | 3/2005 | Yagjian |
| 2005/0066159 A1 | 3/2005 | Poussa et al. |
| 2005/0083947 A1 | 4/2005 | Vaarala et al. |
| 2005/0102514 A1 | 5/2005 | Bergenwall et al. |
| 2005/0125684 A1 | 6/2005 | Schmidt |
| 2005/0138353 A1 | 6/2005 | Spies et al. |
| 2005/0138369 A1 | 6/2005 | Lebovitz et al. |
| 2005/0144439 A1 | 6/2005 | Park et al. |
| 2005/0149732 A1 | 7/2005 | Freeman et al. |
| 2005/0160161 A1 | 7/2005 | Barrett et al. |
| 2005/0190758 A1 | 9/2005 | Gai et al. |
| 2005/0232277 A1 | 10/2005 | See |
| 2006/0002423 A1 * | 1/2006 | Rembert et al. ............. 370/466 |
| 2006/0010324 A1 | 1/2006 | Appenzeller et al. |
| 2006/0072748 A1 | 4/2006 | Buer |
| 2006/0072762 A1 | 4/2006 | Buer |
| 2006/0136437 A1 | 6/2006 | Yamasaki |
| 2006/0177061 A1 | 8/2006 | Orsini et al. |
| 2006/0198368 A1 * | 9/2006 | Guichard et al. ............. 370/389 |
| 2007/0076709 A1 | 4/2007 | Mattson et al. |
| 2007/0186281 A1 | 8/2007 | McAlister |
| 2008/0040775 A1 | 2/2008 | Hoff et al. |
| 2008/0083011 A1 | 4/2008 | McAlister et al. |
| 2008/0127327 A1 | 5/2008 | Carrasco |

OTHER PUBLICATIONS

U.S. Office Action in U.S. Appl. No. 11/541,424, mailed on Sep. 18, 2009.

U.S. Office Action in U.S. Appl. No. 11/880,890, mailed on Dec. 14, 2009.

U.S. Office Action in U.S. Appl. No. 11/649,336, mailed on Dec. 16, 2009.

Office Action from U.S. Appl. No. 11/649,336, Dated: Feb. 27, 2009, 17 pages.

Office Action from U.S. Appl. No. 11/880,890, Dated: Mar. 3, 2009, 18 pages.

Office Action from U.S. Appl. No. 11/649,336, Dated: Jul. 9, 2009, 15 pages.

Frankel, S. "Demystifying the IPsec Puzzle," *Artech House*, Ch. 5, pp. 87-127 (2001).

Frankel, S. "Demystifying the IPsec Puzzle," *Artech House*, Ch. 9, pp. 179-205 (2001).

Notice of Allowance from U.S. Appl. No. 11/706, 442 dated Jul. 16, 2010.

Final Office Action from U.S. Appl. No. 11/706, 442 dated Dec. 23, 2009.

Office Action from U.S. Appl. No. 11/706, 442 dated Apr. 28, 2009.

* cited by examiner

IP ENCRYPTION OVER RESILIENT BGP/MPLS IP VPN

RELATED APPLICATION(S)

This application is a continuation-in-part of U.S. application Ser. No. 11/529,559, filed on Sep. 27, 2006 now abandoned. The entire teachings of the above application(s) are incorporated herein by reference.

BACKGROUND OF THE INVENTION

The present invention relates to how enterprise networks can secure their Internet Protocol (IP) traffic using IP Security (IPSec) when that IP traffic is routed over resilient Multi-Protocol Layer Switching (MPLS) Layer 3 Virtual Private Networks (VPNs), also called IP VPNs.

Enterprise networks have been connecting their remote sites using BGP/MPLS IP Virtual Private Networks (VPNs) as defined in the IETF Request For Comment (RFC) 4364, as provided to them by service providers. Enterprise networks have been using those Multi-Protocol Layer Switching (MPLS) networks with different network redundancy scenarios, where Customer Edge (CE) routers can be redundant and/or service Providers Edge (PE) routers can also be redundant.

Problems with the Prior Art

IP VPNs or MPLS BGP VPN (RFC 4364)

Service providers have been supplying IP VPNs to their commercial enterprise customers using MPLS backbones. Enterprise networks are connected to their service provider networks through their edge routers called customer edge (CE) routers. Service providers offer the MPLS VPN through their provider edge (PE) routers.

RFC 4364 describes the network architecture for a service provider to route the enterprise VPN traffic between its PEs.

Enterprise VPN routes are typically communicated from the CE to the PE using an Interior Gateway Protocol (IGP) such as the Open Shortest Path Protocol (OSPF) or an Exterior Gateway Protocol such as Exterior Border Gateway Protocol (eBGP). The service provider's PE propagates the VPN routes, called VPN routing and forwarding (VRF) to its PE peers using Interior BGP (iBGP). The enterprise VPN traffic is forwarded between the PEs connected to the enterprise site of the customer's VPN using MPLS Label Switched Paths (LSPs) in a mesh topology.

Since enterprise networks can use private addresses that cannot be routed over the service provider Internet network, PE routers need to create a new address format using a route distinguisher and the end-user IPv4 prefix address. Multi-Protocol Extensions to iBGP (MP-BGP) can be used to carry those created addresses with BGP Extended Communities Attribute to simplify BGP routing of the VRFs.

Deploying Resilient IP Core Networks

In order to ensure resilient network operations, enterprise customers can also load balance their site traffic over two CEs to the service provider network. Similarly, in order to ensure resilient network operations, service providers can load balance the enterprise traffic over two PEs. Additionally, enterprise customers can choose to use the services of two or more service providers, therefore ensuring that their CEs communicate to different PEs belonging to different service provider networks.

To multi-home the enterprise network to one or multiple service provider networks, paths from the CEs to the PEs must be redundant. Resilient network operations can be implemented through the use of resilient routing protocols such as Virtual Router Redundancy Protocol (VRRP) as defined in RFC 2338, and through the use of load balancing routing configurations such as eBGP load balancing.

Deploying IPSec in the Network

IPSec, as defined in RFC 2401, can work in tunnel mode by encrypting a data packet (if encryption is required since IPSec can be used for authentication only), performing a secure hash (or authentication) on the packet then wrapping the resulting packet in a new IP packet with a new header indicating it has been secured using IPSec.

The two endpoints where data protection through encryption is enforced are called Policy Enforcement Points (PEPs).

The two PEPs must establish the IPSec security services through a Security Association (SA) and in particular, the encryption keys. This is accomplished using the Internet Key Exchange (IKE) protocol, as defined in RFC 2409 (or 4206 for its version 2), which negotiates keys in two phases: the first phase is used to secure a communication channel between the two PEPs and the second phase is used to create two unidirectional IPSec SAs. Traffic can now be encrypted based on the IPSec policy that defines the type of traffic to be protected between two identified IP addresses or subnets.

Limitations when Securing Networks with IPSec

While IPSec secures IP traffic at the network layer, key exchange mechanisms create a number of practical limitations when IPSec is deployed in networks.

Manual keys are generally not used because of the configuration challenges and re-key requirements to implement them in large networks. For those reasons, IKE is normally used for key exchange. However, IKE is based on a secure connection only established between two PEPs, and a resulting key negotiation being completed between those two PEPs. As a result, the connection-oriented nature of IKE has a few drawbacks.

If the traffic needs to be sent and/or received through multiple paths, as would be the case in a resilient network, there is no single pair of points that can be identified to perform key negotiation and no single PEP that can be selected as the ultimate destination in the IPSec tunnel header.

SUMMARY OF THE INVENTION

With the present state of the art, there is no way to enable redundant network designs for enterprise networks when securing traffic using IPSec with IKE.

IKE does not allow the design of the MPLS VPN network to be point-to-multipoint, one CE connected to multiple PEs, or multipoint-to-multipoint, multiple CEs connected to multiple PEs.

The present invention gives precedence to the encryption of the Internet Protocol (IP) traffic using IP Security (IPSec) at the edge of the enterprise network for resilient BGP/MPLS IP VPN network designs. All IP traffic from the enterprise network is protected using IPSec between the distributed enterprise sites over the MPLS network provided by the service provider. The enterprise network manages its own IPSec site-to-site VPN. The service provider independently manages its MPLS network, providing an IP VPN or Layer 3 MPLS VPN to the enterprise. The enterprise IPSec network can thus be seen as an overlay to the MPLS service provider network.

The enterprise network can have a redundant MPLS VPN network provided by one or multiple service providers and the enterprise network can be redundant as well. Because the enterprise IPSec network can be seen as an overlay network to the MPLS network, both the IPSec network and the MPLS network can operate independently. The IP traffic is securely tunneled within IPSec tunnels from the edge to the edge of the enterprise network. The IPSec traffic is also tunneled within MPLS tunnels from the edge to the edge of the service provider network.

Network Overlay of Security Policies and Encryption Keys to the Data Plane

By dividing the generation and distribution of security policies and encryption keys into separate components and combining them in new ways across multiple devices, the fundamental connection-oriented approach of IPSec using IKE can be changed while maintaining most of its present features and all of its security capabilities. This approach can solve the present IPSec/IKE point-to-point limitations to completely secure network traffic over resilient networks and in particular point-to-multipoint and multipoint-to-multipoint networks.

This new three-layer approach to the deployment of IPSec includes the following functional components:

PEP: The PEP devices still exist in the network to protect traffic, but rather than exchanging keys on a one-to-one basis using IKE with other PEPs, they receive their SAs externally from a centralized entity (KAP).

Key Authority Point (KAP): According to the security policies, the KAP generates SAs and encryption keys, and then distributes them to the PEP units and peer KAP devices.

Management and Policy Server (MAP): The MAP generates the security policies and distributes them to the KAP servers.

The result is that common keys can be used by multiple PEP devices for data transmission over multiple paths in a resilient network.

Generation and Distribution of Security Policies and Encryption Keys

Implementing this three-layer approach, PEPs are deployed between the remote enterprise VPN sites that need secure tunnels.

Each PEP is associated with a number of network sets that defines a collection of networks identified by their IP addresses and their subnets. A policy will be defined for the network sets associated with each PEP protecting those networks.

The KAP can be configured with the policies from the MAP, and can distribute those policies and SAs to the PEPs. The KAP can generate a single outbound key for each PEP policy and its associated network sets and distribute it securely to the PEP, as well as its peers. For those remote peer PEPs, that key can become the inbound key. Each PEP network set then receives a pair of inbound and outbound keys per policy from the KAP. PEPs then encrypt the IP traffic using IPSec Encapsulating Security Payload (ESP) from network to network.

Traffic through the PEPs is essentially the same as traffic through any other IPSec gateway except that on outbound traffic the source and destination IP addresses are maintained from the original and unencrypted packet. In other words, the initial IP address is preserved from encryption.

Depending on the capability of the system, policies can be defined by network topologies such as point-to-point between two sites, mesh-of-sites, and hub-and-spoke site topologies. Policies may also be defined by multicast application if multicast is enabled between the sites. Multiple policies can be applied to the same network set.

Additional information about the details of the generation and distribution of security policies and encryption keys are incorporated by the following co-pending U.S. Patent Applications, all of which are assigned to CiperOptics, Inc., the assignee of the present application, and all of which are hereby incorporated by reference in their entirety:

U.S. Provisional Patent Application No. 60/756,765 entitled SECURING NETWORK TRAFFIC USING DISTRIBUTED KEY GENERATION AND DISSEMINATION OVER SECURE TUNNELS, filed Jan. 6, 2006, which describes how an IP header of an outgoing packet is copied into an outer header of an IPsec tunnel mode packet;

U.S. Provisional Patent Application No. 60/813,766 entitled SECURING NETWORK TRAFFIC BY DISTRIBUTING POLICIES IN A HIERARCHY OVER SECURE TUNNELS, filed Jun. 14, 2006, which describes how to distribute security policies using tunnels; and Data Protection Implementation Over the 4364 Network The IPSec data protection network is an overlay to the MPLS Layer 3 VPN redundant network, so no change is required to the service provider MPLS network. Enterprise traffic from CE to CE is protected. The original IP header is maintained and in the clear as the packet IP address and the entire original packet including both its header and its payload is encrypted using IPSec ESP. This enables the enterprise customer to leverage the service provider service level agreements (SLAs) and network operations management capabilities. VPN routes between CE and PE are in the clear.

The MAP provides polices for each network to communicate through the MPLS network and protect traffic between CE sites. The KAP provides a single outbound key for each PEP of the MPLS VPN and distributes it securely to the PEP, as well as its peers. And, the KAP can be redundant. Security policies can be additionally tailored to the topology of the MPLS cloud such as full-mesh, partial-mesh, and hub-and-spoke. Policies can also support unicast and multicast IP traffic.

BRIEF DESCRIPTION OF THE DRAWINGS

The foregoing will be apparent from the following descriptions of the invention, as illustrated in the accompanying drawings. The drawings are not necessarily to scale, instead emphasis is placed upon illustrating embodiments of the present invention.

DETAILED DESCRIPTION OF THE INVENTION

A description of preferred embodiments of the invention follows.

Figure 1:
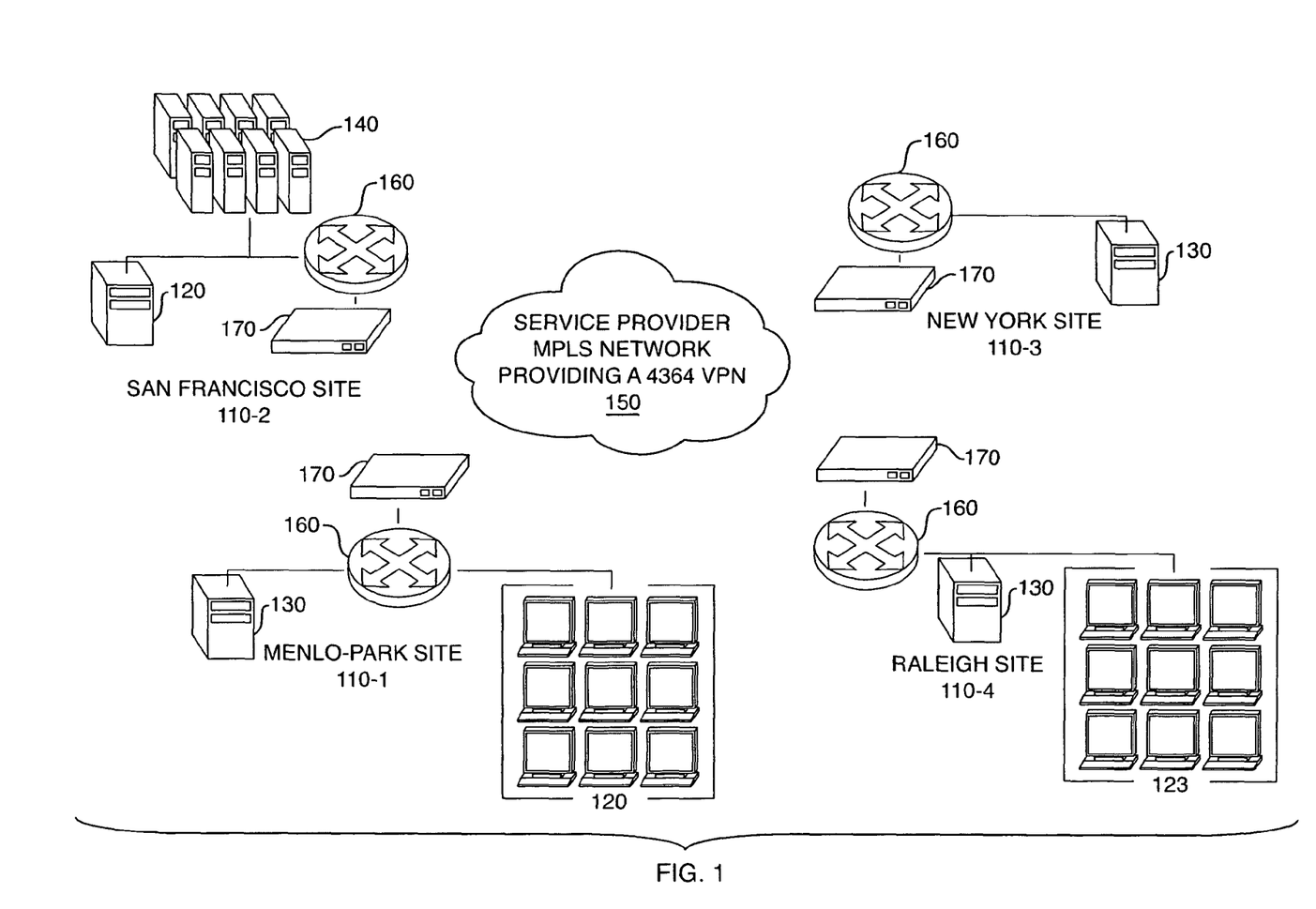
FIG. 1 illustrates a use case of an enterprise network with four remote sites connected over an MPLS network provided by one or multiple service providers and providing a 4364 service to the enterprise.

FIG. 1 is a typical use case of an enterprise network 100. That enterprise network 100 has four remote sites located in four different cities over the United States: Menlo Park, Calif. 110-1, San Francisco, Calif. 110-2, New York, N.Y. 110-3 and Raleigh, N.C. 110-4.

Each site 110 might include a number of users 120, datacenters 130 and/or storage area networks 140. Sites can be considered as fairly large considering their number of subnets and as hubs to smaller branch offices that are not represented in this figure.

Each site 110 is called a VPN site and runs an IP network. Each VPN site is connected to one or more service provider MPLS networks 150, providing a BGP/MPLS IP VPN using enterprise network Virtual Private Network (VPN) routing and forwarding (VRF) functions, as defined in RFC 4364, to the enterprise.

Each site 110 wants to protect its IP traffic over the service provider networks 150 using IPSec encryption. To that end, each site edge router in RFC 4364 (called a CE) is connected to a PEP 170 that provides IPSec encryption and decryption of IP packets. That PEP 170 can be external to the CE 160 or integrated to it as a blade.

The IP traffic for the enterprise is of high value to its business and therefore must be encrypted. But besides encryption, in order to provide that traffic reliably between each site, the enterprise also needs to provide a resilient network.

Figure 2:
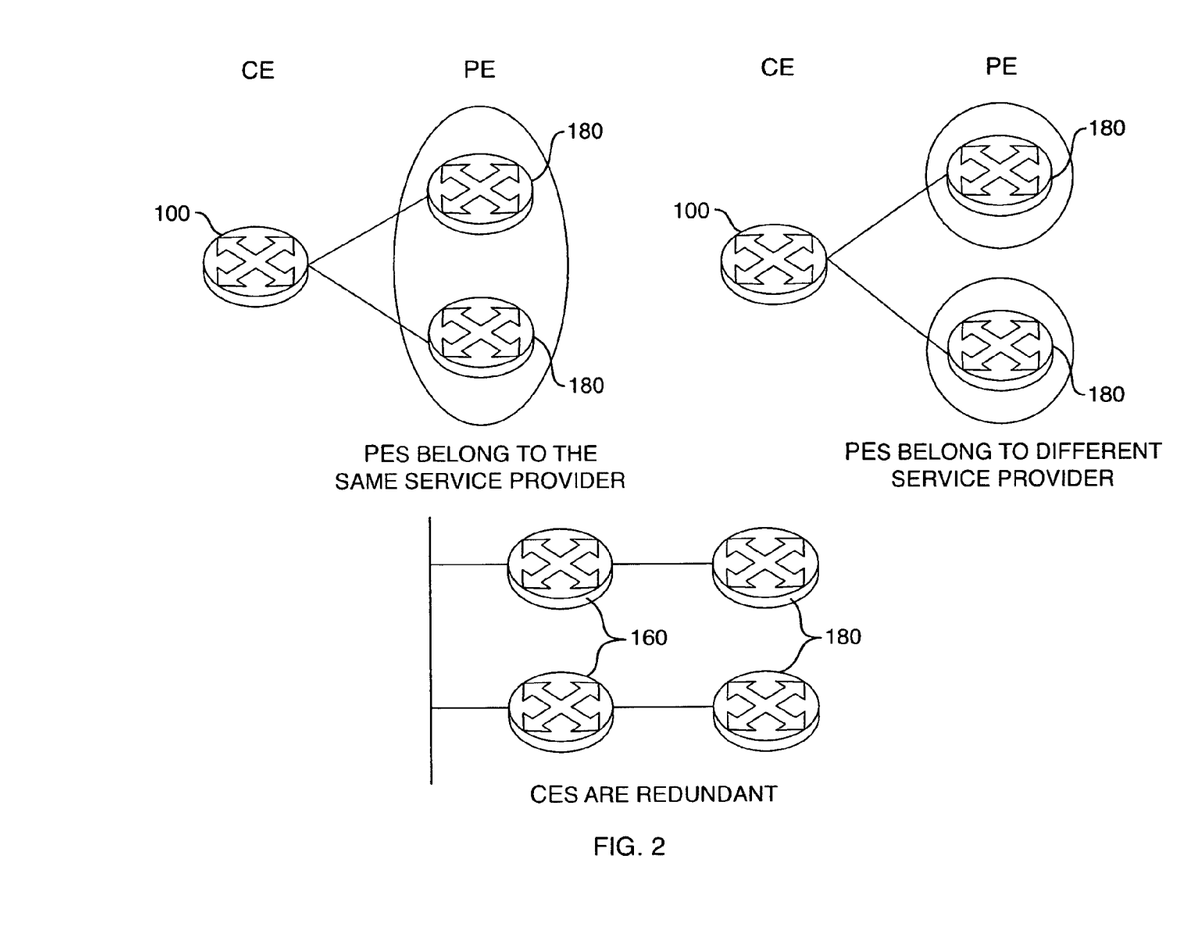
FIG. 2 describes the various network resiliency scenarios possible between CEs and PEs for an enterprise network and its service providers.

Three case scenarios are possible for a resilient network, as represented in FIG. 2; the CE at each site 110 can be redundant; the service provider edge routers (called PEs in RFC 4364) inside the MPLS network 150 can be redundant; or, the PE can belong to one or more service providers.

The minimum resiliency scenario is two PEs 180. The maximum resiliency scenario involves multiple CEs 160 and multiple PEs 180 belonging to multiple service providers. Full mesh connectivity would thus require maintaining 6 tunnels between the 4 endpoints.

Different network protocols can be used to multi-home a CE 160 to a PE 180. CEs 160 can load balance their routing traffic across the PEs 180 using so-called eBGP load balancing. CE and PEs can also provide resilient routing. In other words, if a particular CE or PE is unable to route traffic anymore, a back-up router can take ownership of routing traffic. In that case, the CEs 160 or the PEs 180 must be running another routing protocol such as VRRP as defined in RFC 2338.

Let's assume that instead of having four VPN sites 110, the enterprise has n (n>2) VPN sites 110, with full mesh connections between the sites. Let's also assume that for each site, the enterprise has multiple policies (such as an encrypted, clear and drop policy for protocol pairs).

If IPSec is operated between each PEP 170, and IKE is used for authentication of the nodes and encryption of the traffic, then the total number of tunnels between the sites 110 is calculated with binomial coefficients:

$$(n2)=n!/(2!(n-2)!)=((n-1)\times n)/2$$

And the total number of IPSec SAs for those tunnels would be:

$$2\times(n2)=(n-1)\times n$$

The consequence of this large number is that network management, as well as network performance, becomes quite a challenge, especially if each site has multiple subnets to protect. The PEPs 170 must provide encryption at wire speed, therefore operating with high throughput and low latency capabilities.

Furthermore, IPSec using IKE for key generation can only operate between two endpoints. In other words, IKE is a connection-oriented protocol between two endpoints. IKE phase I provides authentication and a secure channel between the two endpoints and IKE phase II negotiates the IPSec SAs between the two endpoints.

Therefore, using IPSec with IKE for key generation does not allow the network design to be redundant and load-balanced. In other words, IKE cannot be used between four PEPs at the same time, if the traffic is load-balanced or redundant between each pair of PEPs, as illustrated in FIG. 3.

Figure 3:
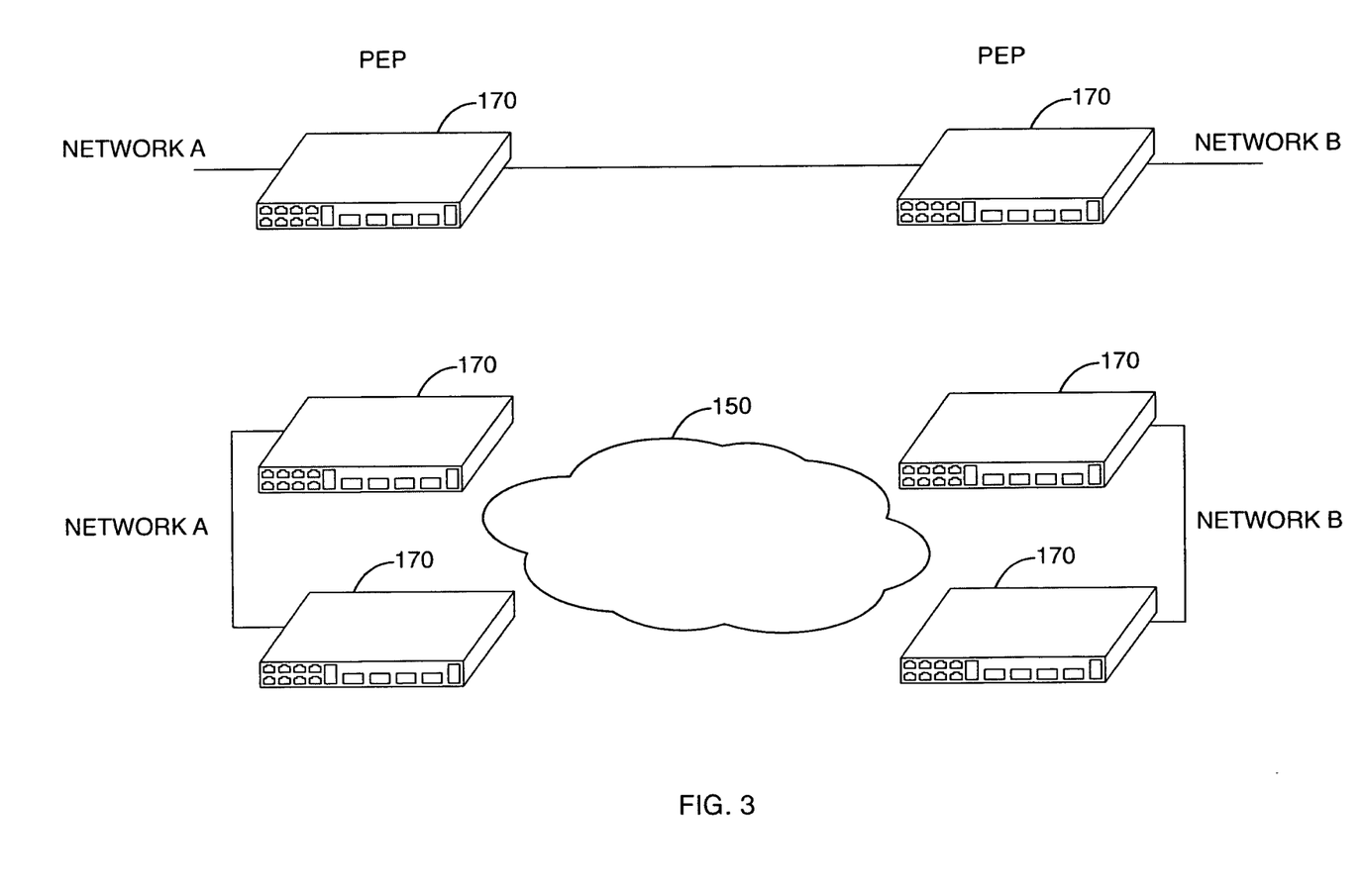
FIG. 3 describes the set-up of IPSec tunnels and SAs for two networks, network A and network B, between two PEPs and when those PEPs are redundant.

One way to encrypt traffic between two networks, network A and network B using IPSec ESP, as in FIG. 3, would be to establish two IPSec SAs that can be used between each pair of PEPs 170. The same security policies and encryption keys would be used between each pair of PEPs 170.

Figure 4:
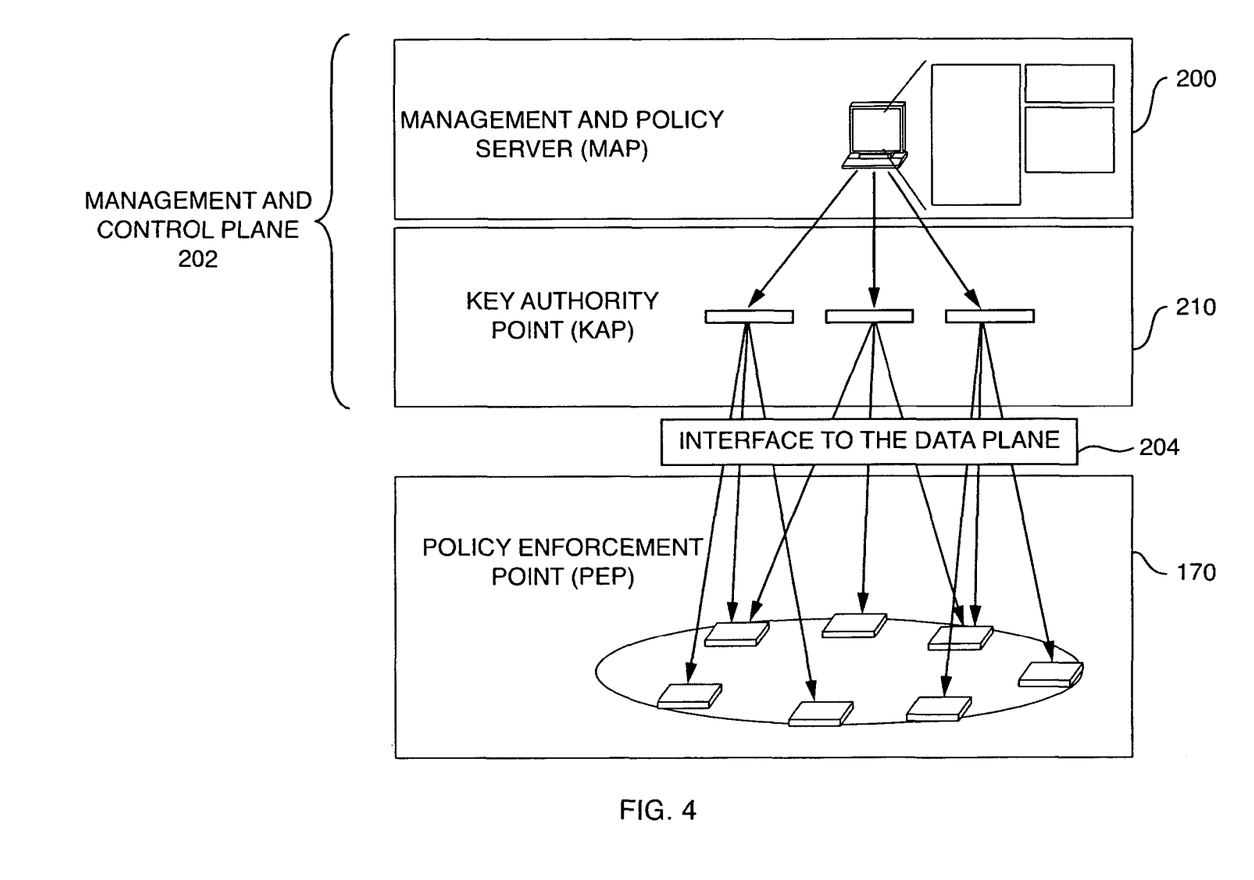
FIG. 4 describes the network overlay of the management and control plane to the data plane for the generation of the security policies and encryption keys.

This can lead to the solution provided in FIG. 4, where security policies and encryption keys overlay the data plane for the encryption. In other words, the management and control plane 202 does not coexist with the data plane 204. One layer provides the security policies that can be viewed as the management plane and another layer provides the encryption keys that can be viewed as the control plane. Encryption keys are generated according to the security policies.

In the illustrated architecture, the device providing the security policy is called a Management Authority Point (MAP) 200, whereas the device providing the encryption keys is called a Key Authority Point (KAP) 210.

The MAP 200 interfaces to the KAP 210, which interfaces itself to the PEPs 170.

The KAP 210 can be redundant. All policies and keys shall be securely stored and distributed. Policies for re-key should be enabled, and each node (MAP, KAP and PEP) should be securely authenticated and authorized to accomplish its function.

Figure 5:
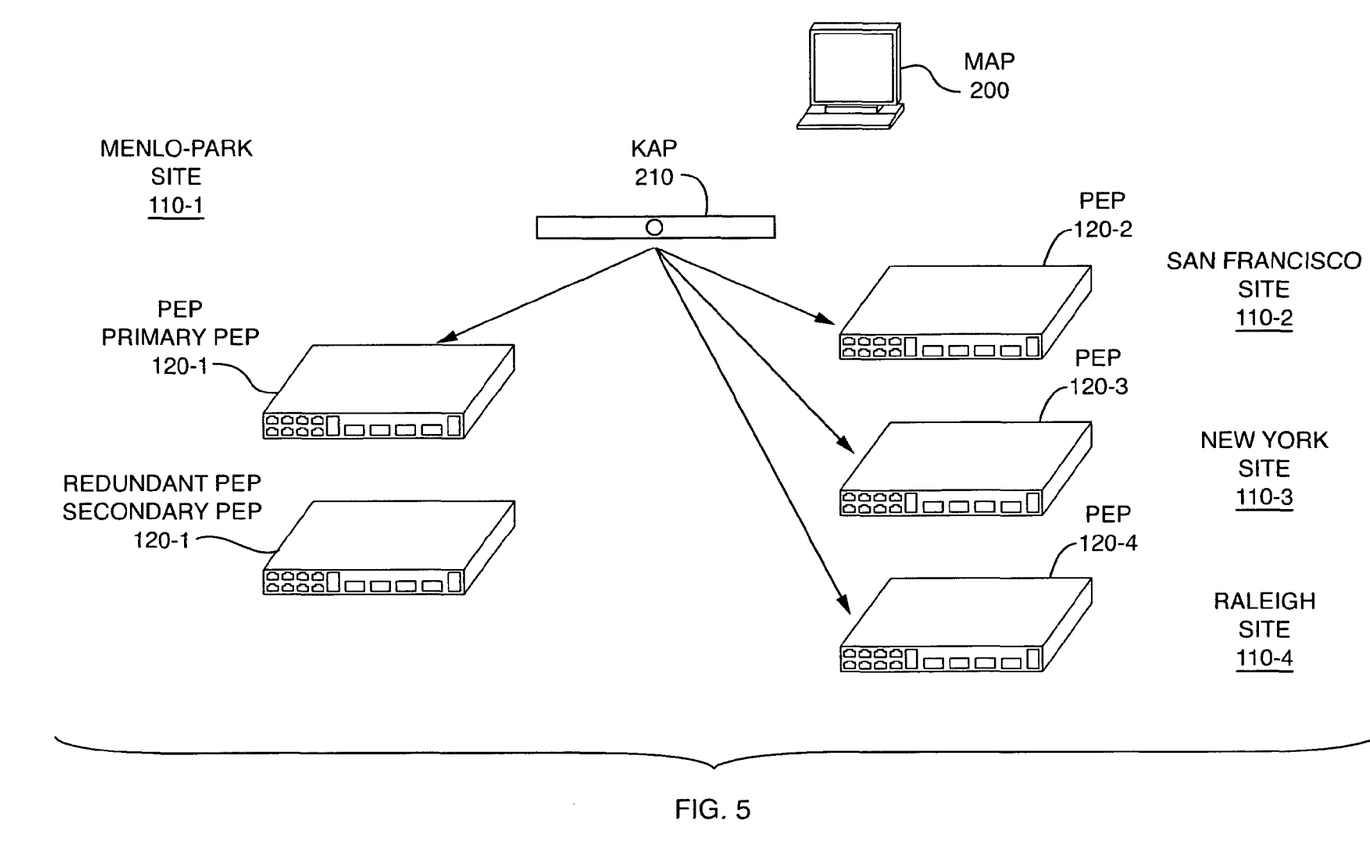
FIG. 5 describes how a KAP with the security policies defined by the MAP generates each outbound key for each PEP of the enterprise site.

Applying the concepts developed in FIG. 4 leads to FIG. 5, which describes a preferred implementation of key exchanges between multiple PEPs 170.

In FIG. 5, the primary PEP 170-1 located at the Menlo Park VPN site 110-1, will receive its outbound encryption key "k1" from the KAP 210. The KAP 210 itself would generate k1. The Menlo Park PEP 170-1 uses that key to encrypt its traffic. That key is also used by the PEPs (170-2, 170-3, 170-4) located at other sites 110 as inbound keys for traffic coming from the Menlo Park PEP 170-1. The KAP 210 thus also distributes k1 to the PEPs (170-2, 170-3, 170-4) located at the San Francisco, New York and Raleigh sites (110-2, 110-3, 110-4, respectively).

When a redundant or secondary PEP 170-1-r is used at the Menlo Park site 110-1, the same security policy and encryption keys will apply both to the primary PEP 170-1 and secondary PEP 170-1-r.

Figure 6:
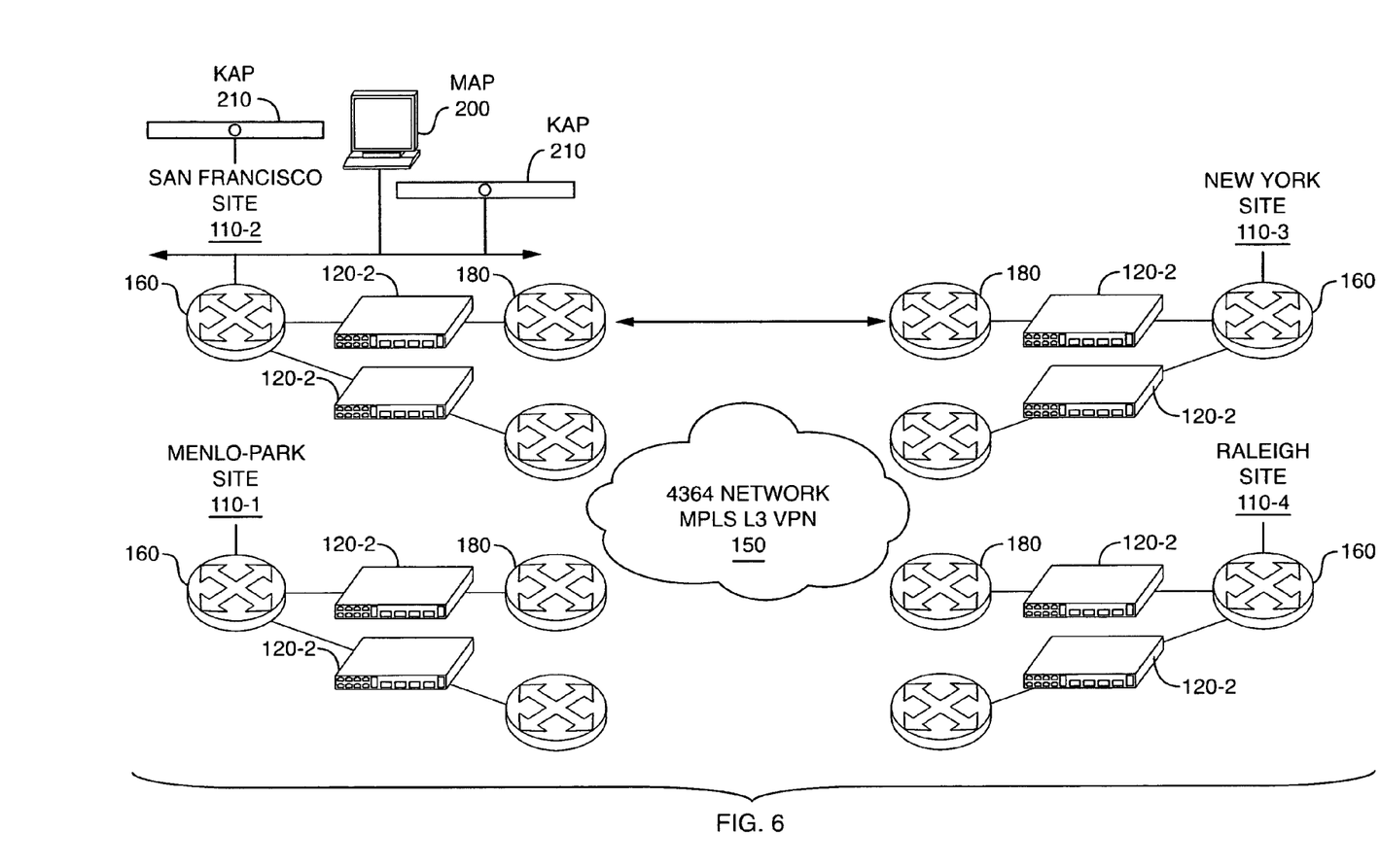
FIG. 6 details the IP addresses and subnets of the remote enterprise sites with their associated PEPs connected to the service provider MPLS network.

Applying the concepts of FIG. 5, with the resiliency scenarios defined in FIG. 2 to the use case provided in FIG. 1, gives an overall solution as illustrated in FIG. 6.

For example, the MAP 200 and KAP 210 are located in the San Francisco site 110-2 and provide policy and key generation and distribution for the four sites. Each site (110-1, 110-2, 110-3, 110-4) has a redundant PEP (120-1-r, 120-2-r, 120-3-r, 120-4-r). For each subnet per site, the MAP 200 needs to create four sets of policies and keys, and four mesh encryption tunnels.

Encryption of each site's VPN traffic at a PEP 120 is tunneled into the MPLS tunnel. IPSec tunnels are tunneled into MPLS tunnels giving the following packet frame:

MPLS VPN label (unmodified IP header IPSec (IP header and payload)).

The initial IP header is maintained and in the clear as the packet IP address. The entire initial packet including both its header and its payload coming from the CE 160 is encrypted using IPSec tunnel mode. VPN routes communicated by the CE 160 to the PE 180 are in the clear.

Generalizing now our solution to a number of n sites, the total number of tunnels is reduced:

$$(n\, n-1) = n!/((n-1)!(n-n+1)!) = n$$

And the total number of SAs is:

$$2 \times (n\, n-1) = 2n,$$

reducing the number of SAs by a factor of: 2/(n−1).

Therefore, this solution significantly reduces the complexity of the network design and network operations management, while allowing the enterprise network to use IPSec encryption with a resilient MPLS network design.

While this invention has been particularly shown and described with references to example embodiments thereof, it will be understood by those skilled in the art that various changes in form and details may be made therein without departing from the scope of the invention encompassed by the appended claims.

What is claimed is:

1. A method for operating on a data packet to provide an enterprise networking environment over a service provider network, comprising:
    a customer edge (CE) router function, located within the enterprise network, for:
        providing the data packet, wherein the data packet includes a header and payload;
    a Policy Enforcement Point (PEP) function for:
        applying an IPSec protocol to the data packet, including encrypting the header and payload of the data packet received from the CE router function and forming an encrypted header and encrypted payload of the data packet;
        applying a security association policy to the data packet;
        maintaining the header of the data packet in non-encrypted form; and
        forming an encrypted data packet including: i) the header of the data packet maintained in non-encrypted form, and ii) the encrypted header and encrypted payload of the data packet;
    a provider edge router function, located within the service provider network, for:
        applying an MPLS protocol to the encrypted data packet; and
        forwarding the encrypted data packet according to the enterprise network VirtualPrivate Network (VPN) routing and forwarding (VRF).

2. The method of claim 1, additionally comprising:
    receiving the security association from a network overlay that is responsible for distributing at least one of security policies and encryption keys to the PEP function.

3. The method of claim 2 wherein the network overlay additionally comprises:
    a security policy layer; and
    an encryption key layer.

4. The method of claim 3 wherein the security policy layer is provided by a Management And Policy (MAP) server and the encryption key layer is provided by a Key Authority Point (KAP) server; and wherein the PEP function is provided by a Policy Enforcement Point (PEP).

5. The method of claim 4 additionally wherein one outbound encryption key is provided for the PEP that becomes the inbound encryption key for other PEPs.

6. The method of claim 4 additionally comprising, by the KAP:
    generating outbound keys; and
    distributing pairs of inbound and outbound keys for each associated PEP.

7. The method of claim 1, additionally comprising:
    given the data packet received from the CE router function is an IP packet including an IP header, maintaining the IP header in the IP packet in non-encrypted form as an IP address of the encrypted packet; and
    wherein encrypting the data packet includes encrypting the entire IP packet both its header and its payload using IPSec ESP.

8. The method of claim 1, additionally comprising:
    providing resiliency, by connecting two or more CEs to two or more PEs with multiple paths between the CEs and PEs.

9. The method of claim 8 wherein two PEs are controlled by different service providers.

10. The method of claim 8 wherein full mesh connectivity between n, where n is greater than 2, enterprise sites is provided by no more than n tunnels and no more than 2n security associations.

11. The apparatus of claim 10, wherein the PEP is additionally for receiving the security association from a network overlay that is responsible for distributing at least one of security policies and encryption keys to PEPS.

12. The apparatus of claim 11 additionally comprising:
    a Management And Policy (MAP) server for providing the security policy layer; and
    a Key Authority Point (KAP) for providing the encryption key layer.

13. The apparatus of claim 10, additionally comprising
    given the data packet received from the CE router is an Internet Protocol (IP) packet including an IP header, an IP level packet encryptor that maintains the IP header in the IP packet in non-encrypted form as an IP address of the encrypted packet, and encrypts the entire IP packet both its header and its payload using IP Sec ESP.

14. The apparatus of claim 13 wherein two PEs are controlled by different service providers.

15. The apparatus of claim 13 wherein full mesh connectivity between n enterprise sites, where n is greater than 2, is provided by no more than n tunnels and no more than 2n security associations.

16. The apparatus of claim 10, additionally comprising:
    two or more CEs; and
    two or more PEs, with multiple paths through the service provider network made between the CEs and PEs.

17. An apparatus for operating on a data packet to provide an enterprise networking environment over a service provider network, comprising:
    a customer edge (CE) router, implemented at least partially in hardware, within the enterprise network for providing the data packet, wherein the data packet includes a header and payload;
    a Policy Enforcement Point (PEP) function arranged to:
        apply an I PSec protocol to the data packet, including to encrypt the header and payload of the data packet received from the CE router and form an encrypted header and encrypted payload of the data packet; apply a security association policy to the data packet; maintain the header of the data packet in non-encrypted form; and form an encrypted data packet including: i) the header of the data packet maintained in non-encrypted form and ii) the encrypted header and encrypted payload of the data packet;

and within the service provider network,
a provider edge (PE) router arranged to: apply an MPLS protocol to the encrypted data packet; forward the encrypted data packet according to enterprise network Virtual Private Network (VPN) routing and forwarding (VRF) tables.

18. The apparatus of claim 17 wherein the network overlay additionally comprises:
a security policy layer; and
an encryption key layer.

19. The apparatus of claim 18 wherein one outbound encryption key is provided for each PEP site in the enterprise network, and that key becomes an inbound encryption key for the other PEP sites.

20. The apparatus of claim 18 wherein the KAP additionally generates outbound keys and distributes pairs of inbound and outbound keys for each associated PEP.

* * * * *